INVENTOR
BARRY L. FROST
BY Robert H. Johnson
ATTORNEY

INVENTOR
BARRY L. FROST
BY *Robert H. Johnson*
ATTORNEY

United States Patent Office 3,392,602
Patented July 16, 1968

3,392,602
DRIVE-STEER AXLE
Barry L. Frost, Jackson, Mich., assignor to Clark Equipment Company, a corporation of Michigan
Filed Sept. 19, 1966, Ser. No. 580,400
6 Claims. (Cl. 74—720.5)

This invention relates to drive-steer axles, and more particularly to axles that provide differential steering and are especially suitable for track laying vehicles, although they also are applicable to wheeled vehicles.

A principal object of my invention is to provide an improved drive-steer axle.

In carrying out my invention in a preferred embodiment thereof I provide first and second planetary gear sets, each gear set having a sun gear, a plurality of planet gears and a ring gear. The sun gears are arranged to be driven by the vehicle prime mover or held from rotation and the planet gears are arranged to drive tracks or wheels on opposite sides of the vehicle. The ring gears are interconnected by mechanism which includes first and second gears that mesh with each other so that if one of the ring gears rotates in one direction the other ring gear must rotate in the opposite direction. A reversible variable displacement fluid pump is arranged to be driven by the vehicle prime mover and is connected to a reversible motor which has first and second ports to supply pressurized fluid thereto so that the motor may be held from rotation or driven in either direction of rotation. The motor is connected to the first gear so that the ring gears may be held from rotation or caused to rotate oppositely from each other in either direction. Third and fourth gears are arranged to be driven by the vehicle prime mover. A first fluid actuated clutch is disposed between the first and third gears and is operable to connect the first and third gears for conjoint rotation. A second fluid actuated clutch is disposed between the third and fourth gears and is operable to connect the third and fourth gears together for conjoint rotation. A first pressure regulating valve is connected to the first motor part and to the first clutch and is operable to limit the pressure of fluid supplied to the first port and supply pressurized fluid to the first clutch when the fluid reaches a predetermined pressure. A second valve is connected to the second motor port and to the second clutch and is operable to limit the pressure of the fluid supplied to the second port and supply pressurized fluid to the second clutch when the fluid reaches a predetermined pressure.

The above and other objects, features and advantages of my invention will become more readily apparent to persons skilled in the art when the following detailed description is taken in conjunction with the accompanying drawing wherein.

Figure 1:
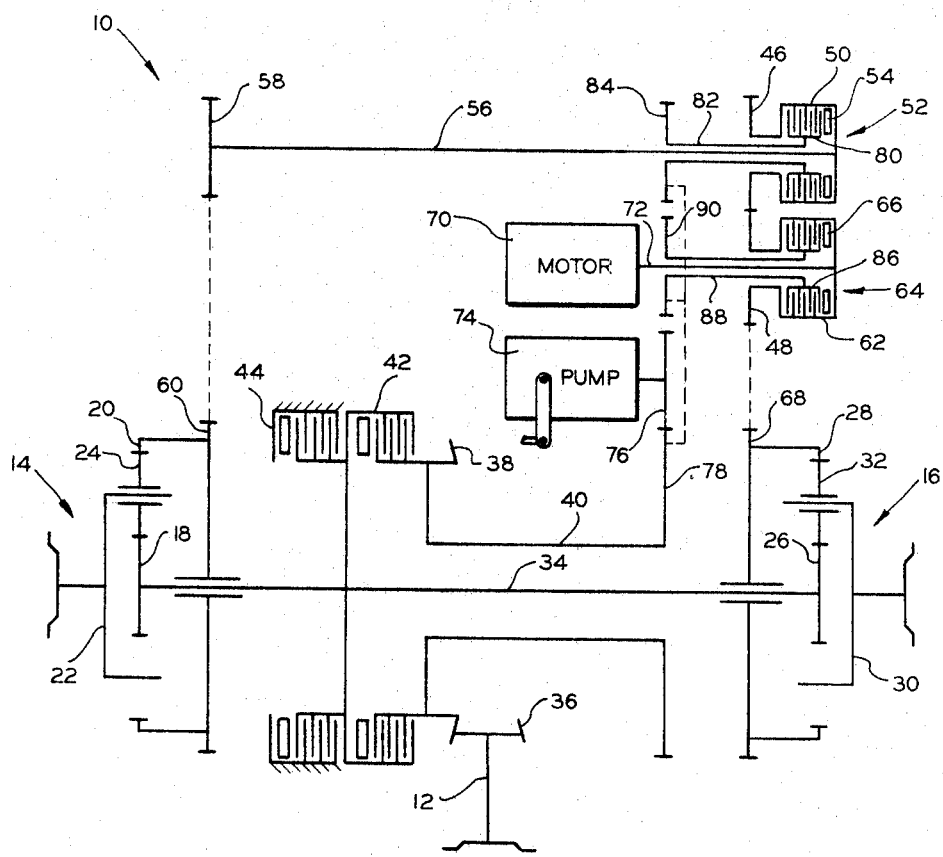
FIGURE 1 shows schematically a preferred embodiment of my invention.

Referring now to the drawing, the reference numeral 10 denotes generally a drive-steer axle having a rotatable shaft 12 which serves as power input means and is connectible to a vehicle prime mover by means of a propeller shaft or the like, not shown. Shaft 12 transmits power to drive a pair of planetary gear sets 14 and 16 which can be connected to either suitable tracks or wheels, depending upon the type of vehicle with which the axle is being used. Planetary gear set 14 includes a first element or sun gear 18, a second element or ring gear 20 and a third element which is an assembly including a planet carrier 22 on which at least one planet gear 24 is mounted for rotation, planet gear 24 meshing with sun gear 18 and ring gear 20. The planet carrier can be connected to the drive wheel or track on one side of the associated vehicle.

Similarly, planetary gear set 16 includes a first element or sun gear 26, a second element or ring gear 28 and a third element which is an assembly including a planet carrier 30 on which at least one planet gear 32 is mounted for rotation, planet gear 32 meshing with sun gear 26 and ring gear 28. Planet carrier 30 can be connected to a drive wheel or track on the opposite side of the associated vehicle from planet carrier 22. Sun gears 18 and 26 are fixed to a shaft 34.

Fixed to shaft 12 is a bevel gear 36 which meshes with another bevel gear 38 that is fixed to a rotatable sleeve shaft 40 which is coaxial with shaft 34 and through which shaft 34 passes. Connected to gear 38 is one part of a fluid actuated multiple plate clutch 42, the other part of which is connected to shaft 34. Consequently, when pressurized fluid is supplied to clutch 42, causing it to engage, shaft 34 is coupled to gear 38 and sleeve shaft 40 for conjoint rotation therewith. Adjacent to clutch 42 there is disposed a fluid-actuated multiple plate brake 44 which has one part connected to shaft 34 and has the other part anchored. When pressurized fluid is supplied to brake 44 causing it to engage shaft 34 will be held from rotation. At this point it will be seen that when clutch 42 is engaged power from shaft 12 is being transmitted through shaft 34, causing sun gears 18 and 26 to rotate in one direction or the other, depending upon the direction of the rotation of shaft 12. Also, when brake 44 is engaged shaft 34, and hence sun gears 18 and 26, are held from rotation. As will be explained more fully hereinafter when clutch 42 is engaged axle 10 can be controlled so that the associated vehicle will negotiate a turn about a point which lies ouside the tracks or drive wheels associated with the vehicle and when brake 44 is engaged the vehicle can turn about a point midway between the tracks or drive wheels.

Ring gears 20 and 28 are interconnected by means of a pair of meshing gears 46 and 48. Gear 46 is connected to the drum portion 50 of a conventional fluid actuated multiple plate clutch 52 which includes a piston 54 for compressing the plates thereof to engage the clutch. Also connected to drum portion 50 for rotation therewith is a shaft 56 to which a gear 58 is connected for conjoint rotation. Gear 58 meshes with another gear 60 which is connected to gear 20 for conjoint rotation therewith.

Gear 48 is connected to the drum portion 62 of a fluid actuated multiple plate clutch 64 which includes a piston 66 for compressing the plates thereof to engage the clutch. Also, gear 48 meshes with another gear 68 which is connected to ring gear 28 for rotation therewith.

At this point it will be clear that whenever ring gear 20 rotates in one direction that ring gear 28 must rotate in the opposite direction due to the above-described interconnection between these two gears, including the meshing of gears 46 and 48. Further, it will be clear that when either of gears 20 and 28 are held from rotation that both must be held from rotation.

A reversible fluid motor 70 having a pair of ports 92 and 94 is connected by means of a shaft 72 to drum portion 62 of clutch 64. Motor 70 is fluidly connected to a pump 74 having a pair of ports 96 and 98 and an operator controlled lever 97 for reversing the output of the pump and varying the displacement of it. By proper manipulation of pump 74 motor 70 may be held from rotation or caused to rotate in either direction. Pump 74 is driven by a gear 76 which meshes with another gear 78 that is connected to sleeve shaft 40 for conjoint rotation.

At this point it should be noted that for any given direction of rotation of shaft 12, assuming clutch 42 is engaged so that sun gears 18 and 26 are being driven and motor 70 is held from rotation, that the planet carriers 22 and 30 will rotate at the same speed with the result that the vehicle will be driven along a straight line. Now, if motor 70 is operated to rotate in either direction there will be a differential between the speeds of rotation of planet carriers 22 and 30 with the result that the associated vehicle will tend to turn toward the side with the planet carrier having the lower speed of rotation.

The structure which has been generally described thus far will function as a drive-steer axle; however, in heavy duty applications, such as those involving track laying vehicles which are intended for use in rough terrain involving mud, for example, there is often substantial resistance to turning of the vehicle, and so motor 70 must have a substantial capacity, together with the associated fluid circuitry or provision must be made to supplement the power being transmitted by motor 70 to control rotation of ring gears 20 and 28. Motor 70 can be supplemented through the selective engagement of either clutch 52 or 64. The hub portion 80 of clutch 52 is connected to a sleeve shaft 82 for conjoint rotation therewith. Also connected to sleeve shaft 82 for conjoint rotation therewith is a gear 84 which meshes with gear 78. Similarly, the hub portion 86 of clutch 64 is connected to a sleeve shaft 88 for conjoint rotation therewith. Connected to sleeve shaft 88 for conjoint rotation therewith is a gear 90 which meshes with gear 78.

Since gears 84 and 90 both mesh with gear 78 they will rotate whenever shaft 12 is being driven. Further, it should be noted that gear 84 will always rotate in the same direction that gear 90 rotates.

By engaging clutch 52 gear 84 is connected to gear 46 for conjoint rotation therewith. Consequently, power from shaft 12 can be transmitted to ring gears 20 and 28 through sleeve shaft 40, gear 78 and gear 84 as well as through motor 70.

Engagement of clutch 64 connects gear 90 to gear 48 for conjoint rotation therewith, thereby providing a power path from shaft 12 to ring gears 20 and 28 through sleeve shaft 40, gear 78 and gear 90 in addition to the power path through motor 70.

Which one of clutches 52 and 64 is engaged and the extent to which it is engaged depends upon the direction of rotation of motor 70 and the resistance to rotation of motor 70 which is reflected in the pressure of fluid being supplied to the motor.

Figure 2:
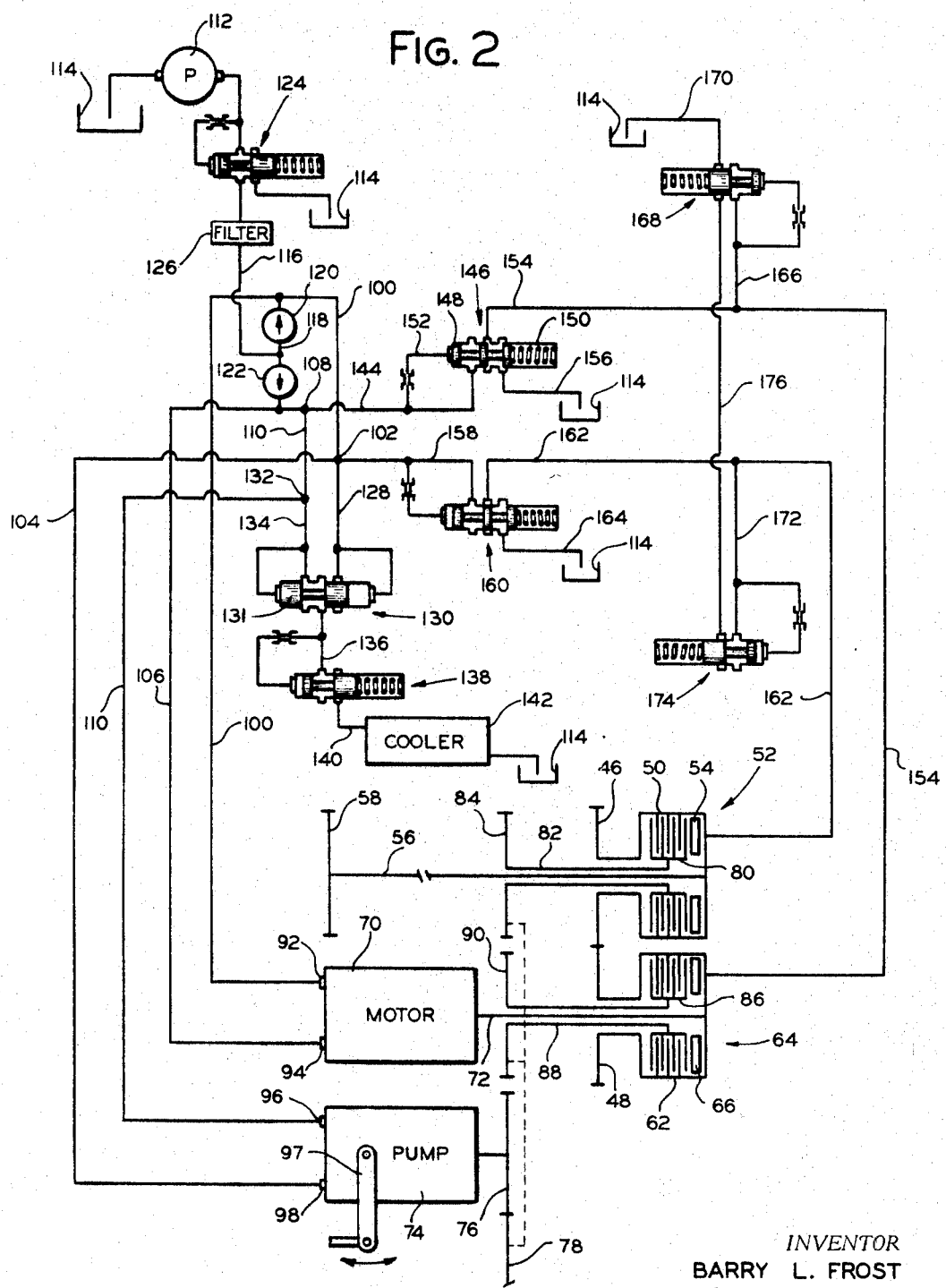
FIGURE 2 is a diagram showing the fluid circuitry for controlling the actuation of certain of the clutches.

Turning now specifically to FIG. 2, the means for determining which one of clutches 52 and 64 should be engaged and when they should be engaged will be explained. As mentioned earlier motor 70 includes a pair of ports 92 and 94 and pump 74 includes a pair of ports 96 and 98. Connected to port 92 is a fluid conduit 100 which communicates with a junction 102. A fluid conduit 104 also communicates with junction 102 and is connected to port 98. Similarly, a fluid conduit 106 is connected to port 94 and communicates with a junction 108. Also communicating with junction 108 is a fluid conduit 110 which is connected to port 96. Fluid conduits 100, 104, 106 and 110 define what is generally referred to as a "closed fluid circuit" between motor 70 and pump 74. Thus, if pump 74 is being operated so that port 96 is the outlet port, then conduits 110 and 106 are the high pressure conduits and conduits 100 and 104 are the low pressure conduits. Conversely, if pump 74 is being operated so that port 98 is the outlet port, then conduits 104 and 100 are the high pressure conduits and conduits 106 and 110 are the low pressure conduits.

In order to maintain the closed fluid circuit between motor 70 and pump 74 filled with fluid there is provided a charging pump 112 which draws fluid from a reservoir 114 and supplies pressurized fluid via a fluid conduit 116 and a fluid conduit 118 which is connected at opposite ends thereof to conduits 100 and 106 and in which a pair of one way check valves 120 and 122 are disposed. Disposed in conduit 116 is a pressure regulating valve 124 which serves to bypass fluid from pump 112 back to sump 114 whenever the pressure generated by pump 112 reaches a predetermined maximum value which may be 185 p.s.i.g., for example. Also disposed in conduit 116 is a filter 126 which serves to clean the fluid passing therethrough.

Connected to junction 102 is a fluid conduit 128 which communicates with the bore of a shuttle valve 130 at the side and one end thereof. Connected to conduit 110 at 132 is a fluid conduit 134 which communicates with the side and the other end of the bore of shuttle valve 130. Connected to the bore of shuttle valve 130 intermediate the side connections of conduits 128 ad 134 is another conduit 136 which communicates with a pressure regulating valve 138 which is set to maintain a lower pressure than regulating valve 124, for example, 175 p.s.i.g. Regulating valve 138 bypasses fluid back to sump 114 via a conduit 140 and a cooler 142. Slidably disposed in valve 130 is a spool 131 which shifts to communicate conduit 136 with whichever one of conduits 128 and 132 is on the low pressure side of the fluid circuit between the pump and motor.

A fluid conduit 144 communicates with conduits 106 and 110 at junction 108 and is connected to the bore of a fluid pressure regulating valve 146. Regulating valve 146 includes a movable spool 148 slidably disposed in the bore and biased in one direction by a spring 150. Pressurized fluid is directed to the end of spool 148 opposite spring 150 by a conduit 152 which communicates with conduit 144. Also communicating with the bore of valve 146 is a conduit 154 which communicates pressurized fluid to clutch 64 behind piston 66 and a conduit 156 which connects with reservoir 114. Valve 146 is a conventional pressure regulating valve and functions so that when the pressure of fluid in conduit 144 reaches a predetermined pressure, for example 4,000 p.s.i.g., the force directed against the end of spool 148 causes it to shift against the bias of spring 150 so that fluid is bled from conduit 144 to conduit 154. When this occurs pressurized fluid is directed to clutch 64, causing piston 66 to compress the plates of the clutch so that it engages. Also, it will be noted that when the pressure of fluid in conduit 144 is below the predetermined maximum that conduit 154 is connected through valve 146 with conduit 156, and hence reservoir 114.

Connected to conduits 100 and 104 at junction 102 is a conduit 158 which communicates with the bore of a conventional pressure regulating valve 160 which is identical with valve 146. Also communicating with the bore of valve 160 is a conduit 162 which directs pressurized fluid to clutch 52 behind piston 54 and a conduit 164 which connects with reservoir 114. Valve 160 functions in the same manner as valve 146 so that when pressurized fluid reaches a predetermined limit, for example 4,000 p.s.i.g., fluid is bled from conduit 158 to conduit 162 and when the pressure of fluid in conduit 158 is below this maximum value conduit 162 is placed in communication with conduit 164, and hence reservoir 114.

Connected to conduit 154 is another conduit 166 which communicates with a conventional pressure regulating valve 168 which is connected to reservoir 114 via a conduit 170. Valve 168 regulates the maximum pressure of fluid in conduit 154 to a predetermined maximum, for example, 200 p.s.i.g., and functions to connect conduit 166 with conduit 170 and so bypass fluid to reservoir 114 whenever fluid in conduit 154 reaches a predetermined maximum. A conduit 172 is connected to conduit 162 and communicates with a regulating valve 174 which is identical to valve 168. Also connected to valve 174 is a conduit 176 which is connected to conduit 170 via valve 168. Valve 174 functions, when a predetermined maximum pressure, for example 200 p.s.i.g., is reached in conduit 162, to connect conduit 172 with conduit 176 and hence reservoir 114.

In order to enable persons skilled in the art to better understand my invention I will now explain the operation of it. It will be assumed that drive-steer axle 10 is embodied in a vehicle which has tracks at either side thereof which are drivingly connected to planet carriers 22 and 30, respectively. Further, it will be assumed that when shaft 12 is driven in a clockwise direction as viewed from the bottom in FIG. 1 that it causes the vehicle to be driven in a direction toward the top of FIG. 1 which will be termed the forward direction.

Assuming now that the operator wishes to drive the vehicle in a forwardly direction straight ahead he will connect shaft 12 to vehicle prime mover so that shaft 12 is rotated in a clockwise direction as viewed from the bottom in FIG. 1. Also, he will position pump control lever 97 so that pump 74 is not generating any pressurized fluid. As a consequence, motor 70 will be held from rotation, and hence ring gears 20 and 28 will be held from rotation. Further, the operator will engage clutch 42 so that sun gears 18 and 26 are being driven. With sun gears 18 and 26 both rotating in a counterclockwise direction, as viewed from the left side in FIG. 1, and ring gears 20 and 28 being held, planet carriers 22 and 30 will also rotate in a counterclockwise direction, as viewed from the left in FIG. 1, and at the same speed. As a result the vehicle will move straight ahead in a forward direction.

Now, if the operator desires to make a left turn he manipulates pump control 97 so that pump 74 begins to supply pressurized fluid from port 98. Pressurized fluid from port 98 is supplied to port 92 of motor 70 via conduits 104 and 100. This causes shaft 72 of motor 70 to rotate in a counterclockwise direction, as viewed from the right in FIGS. 1 and 2. Consequently, gear 48 also rotates in a counterclockwise direction and gear 46 rotates in a clockwise direction, as viewed from the right in FIGS. 1 and 2. This rotation of gears 46 and 48 results in ring gear 20 rotating in a clockwise direction as viewed from the left in FIG. 1. Since sun gear 18 is rotating in a counterclockwise direction, the speed of rotation of planet carrier 22 which is also in a counterclockwise direction will be reduced. The counterclockwise direction of rotation of gear 48, as viewed from the right in FIGS. 1 and 2, drives ring gear 28 in a clockwise direction, as viewed from the right in FIG. 1, and hence the speed of rotation of planet carrier 30 will be increased since sun gear 26 also is rotating in a clockwise direction, as viewed from the right in FIG. 1. Therefore, since the track on the right side of the vehicle will now be running at a higher speed than the track on the left side of the vehicle the vehicle will tend to turn toward the left. So long as the resistance to turning does not become too high the motor 70 and pump 74 have the capacity to transfer the required power to the track on the right side of the vehicle. In the event that the resistance to turning becomes substantially greater, then the pressure in conduits 104 and 100 begins to rise until it reaches 4,000 p.s.i.g. which is the maximum pressure for which the motor 70 and pump 74, for example, are designed to operate. When this maximum pressure is reached regulating valve 160 will shift to the position shown in FIG. 2 which communicates conduit 158 with conduit 162 so that pressurized fluid is bled from conduit 158 to clutch 52 causing it to engage. Engagement of clutch 52 connects gears 84 to gear 46 for conjoint rotation therewith. Since gear 84 is being driven in a clockwise direction of rotation, as viewed from the right in FIGS. 1 and 2, through meshing with gear 78, there is now provided another power path between shaft 12 and ring gears 20 and 28 which supplements the power transfer via motor 70 and pump 74, causing the pressure to remain at 4,000 p.s.i.g. The new power path is via gear 38, shaft 40, gears 78 and 84, shaft 82 and clutch 52.

When it is desired to turn the vehicle toward the right while proceeding in a forwardly direction, the operator simply actuates pump control 97 so that pump 74 supplies pressurized fluid from port 96. As a result shaft 72 of motor 70 is caused to rotate in a clockwise direction, as viewed from the right in FIGS. 1 and 2, so that now ring gear 20 is caused to rotate in a counterclockwise direction as viewed from the left in FIG. 1, thereby increasing the speed of rotation of planet carrier 22, and ring gear 28 is caused to rotate in a counterclockwise direction as viewed from the right in FIG. 1, and hence the speed of rotation of planet carrier 30 is reduced. In the event that the resistance to turning of the vehicle becomes sufficiently great so that the capacity for which the hydraulic system, including pump 74 and motor 70, is reached, then regulating valve 146 is actuated to bypass pressurized fluid from conduit 144 to clutch 64 which is engaged so that gear 90 is coupled to gear 48 thereby providing a supplemental power path from shaft 12 to ring gears 20 and 28.

The vehicle associated with drive-steer axle 10 can also be made to pivot about a point midway between the tracks thereby by engaging brake 44 and disengaging clutch 42. Under this condition of operation sun gears 18 and 26 are held from rotation. With sun gears 18 and 26 being held from rotation and pump control lever 97 actuated to direct pressurized fluid to port 92 of motor 70 so that shaft 72 thereof is caused to rotate in a counterclockwise direction, as viewed from the right in FIGS. 1 and 2, the vehicle will pivot toward the left, or counterclockwise, as viewed from above in FIG. 1. By controlling pump 74 so that pressurized fluid is supplied to motor 70 to cause shaft 72 to rotate in a clockwise direction, as viewed from the right in FIG. 1, then the associated vehicle will pivot toward the right or in a clockwise direction, as viewed from above in FIG. 1.

When the sun gears 18 and 26 are being held, it is also possible to provide an additional power path from shaft 12 to ring gears 20 and 28 via clutches 50 and 64 whenever the resistance to turning of the vehicle becomes so great that the capacity of the hydraulic system, including pump 74 and motor 70, is reached. The fluid circuitry for engaging clutches 52 and 64 works in the same manner as when the sun gears 18 and 26 are being driven, and so it is not explained again.

While only a single preferred embodiment of my invention has been set forth in the above-detailed description, it will be understood that this description is intended to be illustrative only, and that various modifications, changes and the like which are within the scope of my invention will be apparent to persons skilled in the art. Therefore, the omits of my invention should be determined from the following claims.

I claim:

1. In a drive-steer axle having first and second planetary gear sets, each gear set including first, second and third elements, and means for driving the first elements, the combination comprising a first gear drivingly connected to one of the second elements, a second gear meshing with the said first gear and drivingly connected to the other of the second elements, a motor drivingly connected to the said first gear and operable to hold the said first gear from rotation or drive the said first gear in either direction of rotation so that the second elements can be held from rotation or driven oppositely from each other in either direction of rotation, means for drivingly connecting the driving means to the said first gear or the said second gear, and means responsive to the direction of and resistance to rotation of the said motor for actuating the said connecting means so that when the said motor is rotating in one direction the driving means is connected to one of the said gears to drive the said one gear in the same direction of rotation as the said one gear is being driven by the said motor and when the said motor is rotating in the opposite direction the driving means is connected to the other of the said gears to drive the said other gear in the same direction as the said other gears being driven by the said motor.

2. The combination as set forth in claim 1 wherein the said connecting means includes a first clutch for connecting the drive means to the said first gear and a second clutch for connecting the drive means to the said second gear.

3. The combination as set forth in claim 2 wherein the said motor is fluid pressure operated and the said actuating means includes first and second fluid pressure operated pistons connected to the said first and second clutches, respectively, each piston being operable when supplied with pressurized fluid to actuate one of the said clutches to engage, and valve means connected between the said pistons and motor, the said valve means being operable to direct pressurized fluid to the said first piston when the said motor is rotating in one direction and pressurized fluid being supplied to the said motor reaches a predetermined pressure and operable to direct pressurized fluid to the said second piston when the said motor is rotating in the opposite direction and pressurized fluid being supplied to the said motor reaches a predetermined pressure.

4. A drive-steer axle compirsing first and second planetary gear sets, each gear set having first, second and third elements, power input means, means for drivingly connecting the said power input means to the said first elements, a first gear drivingly connected to one of the said second elements, a second gear meshing with the said first gear and drivingly connected to the other of the said second elements, a fluid pump drivingly connected to the said power input means, the said pump having a pair of fluid ports, a fluid motor drivingly connected to the said first gear, the said motor haivng a pair of fluid ports which are connected to the said pair of pump ports, a third gear drivingly connected to the said power input means, a fourth gear drivingly connected to the said power input means so that the said fourth gear always rotates in the same direction as the said third gear, a first fluid pressure actuated clutch which is operable when engaged to drivingly connect the said first and third gears, a second fluid pressure actuated clutch which is operable when engaged to drivingly connect the said second and fourth gears, a first valve connected between one of the said motor ports and the said first clutch and operable to limit the pressure of fluid being supplied to the said one motor port to a predetermined pressure and direct pressurized fluid to the said first clutch when the predetermined pressure is reached, and a second valve connected between the other of the said motor ports and the said second clutch and operable to limit the pressure of fluid being supplied to the said other motor port to the said predetermined pressure and direct pressurized fluid to the said second clutch when the said predetermined pressure is reached.

5. A drive-steer axle as set forth in claim 4 wherein the said pump is reversible and has a variable displacement.

6. A drive-steer axle as set forth in claim 5 and including a brake which when engaged holds the said first elements from rotation and the said connecting means includes a clutch which when engaged drivingly connects the said first elements to the said power input means.

References Cited

UNITED STATES PATENTS 3,250,151   5/1966   Binger _____ 74—720.5

FRED C. MATTERN, JR., *Primary Examiner.*

THOMAS C. PERRY, *Examiner.*